United States Patent
Ari et al.

(10) Patent No.: US 8,234,660 B2
(45) Date of Patent: Jul. 31, 2012

(54) METHOD AND APPARATUS FOR A SUPPORT PLATFORM

(75) Inventors: Nathan Ari, Zoran (IL); Avishai Geller, Tel Aviv (IL)

(73) Assignee: SAP Portals Israel, Ltd., Ra'Anana (IL)

( * ) Notice: Subject to any disclaimer, the term of this patent is extended or adjusted under 35 U.S.C. 154(b) by 1002 days.

(21) Appl. No.: 11/403,025

(22) Filed: Apr. 12, 2006

(65) Prior Publication Data

US 2007/0245356 A1    Oct. 18, 2007

(51) Int. Cl.
*G06F 3/00*    (2006.01)
*G06F 9/44*    (2006.01)
*G06F 9/46*    (2006.01)
*G06F 13/00*    (2006.01)

(52) U.S. Cl. ......... 719/320; 709/201; 709/202; 709/203
(58) Field of Classification Search .................... 719/320
See application file for complete search history.

(56) References Cited

U.S. PATENT DOCUMENTS

| | | | | |
|---|---|---|---|---|
| 5,903,728 A * | 5/1999 | Semenzato | ................... | 709/217 |
| 6,397,256 B1 * | 5/2002 | Chan et al. | ................... | 709/229 |
| 6,553,377 B1 * | 4/2003 | Eschelbeck et al. | ................... | 1/1 |
| 6,871,345 B1 * | 3/2005 | Crow et al. | ................... | 717/175 |
| 7,093,169 B2 * | 8/2006 | Merriam | ................... | 714/47.2 |
| 7,284,042 B2 * | 10/2007 | Beadles et al. | ................... | 709/220 |
| 7,523,466 B2 * | 4/2009 | DeAngelis | ................... | 719/320 |
| 7,546,584 B2 * | 6/2009 | Rovang | ................... | 717/124 |
| 2004/0205473 A1 * | 10/2004 | Fisher et al. | ................... | 715/500 |
| 2005/0038808 A1 * | 2/2005 | Kutch | ................... | 707/102 |

* cited by examiner

*Primary Examiner* — Emerson Puente
*Assistant Examiner* — Kimbleann Verdi
(74) *Attorney, Agent, or Firm* — Buckley, Maschoff & Talwalkar LLC

(57) ABSTRACT

An apparatus and methods for enabling a support person to receive and review information relating to multiple remote nodes and multiple applications running on each node. The apparatus comprises a presentation component accessed by the support person or administrator, and engine installed on each remote node. The engine comprises a manager component, a multiplicity of plug-ins for retrieving information about the server or about the application, and a plug-in manager for each plug-in.

24 Claims, 4 Drawing Sheets

METHOD AND APPARATUS FOR A SUPPORT PLATFORM

BACKGROUND OF THE INVENTION

1. Field of the Invention

The present invention relates to a system and method for supporting application deployment and usage over a computer network.

2. Discussion of the Related Art

In a multi-node multi-user computer network, such as a computer network of a multi-site organization, one or more computer applications are optionally installed on multiple nodes in multiple geographic locations. Within each node, each application can be successfully installed and used, but problems with one or more applications may occur, either during installation or during usage. The problems can stem from various reasons, including the operating system being incompatible with an application's requirements, permission problems, security problems, clashes between installed components, existence or absence of certain files or resources, human errors in installation or in usage, and others. A support person optionally working in a support center, who is in charge of helping users is faced with a multiplicity of possibly distant locations, each user possibly using a different computer or a computer with different installed programs. Often, such a support person has to request each user having a problem to retrieve parameters, details, data or items concerning the computer, the operating system, files, directories, resources, installation details, and the like. Since not all users are computer professionals, explanations on how to retrieve such data are tedious, time consuming and not always successful. Moreover, the support person does not always ask for all required details immediately, either due to lack of knowledge, forgetfulness, or a problem realized to be more complex, or other reasons. As a result, support tasks require substantial manpower of highly-qualified individuals, who spend a lot of their time in trivial and not always fruitful conversations with customers, in order to retrieve data relevant for trouble shooting. The customers, on the other hand, are required to supply answers which are sometimes hard for them to find, suffer long delays in problem spotting and fixing, and might get a feeling that they are not receiving the level of support they expect.

There is therefore a need for an apparatus and method that will enable support center personnel or a system administrator to retrieve information relating to a remote node and applications installed on that node, without user intervention. The information should be general or relate to one or more applications that are supposed to be installed and used on the node and should be as specific

SUMMARY OF THE PRESENT INVENTION

It is an object of the present invention to provide a novel apparatus and method for supporting software installed in a computer network, which overcomes the disadvantages of the prior art. In accordance with the present invention, there is thus provided a method for enabling receiving and presenting to a user using a control and presentation component installed on a first computer, one or more parameters having one or more values associated with one or more second computers, the method comprising the steps of: indicating that one or more programs should be activated on the one or more second computers, sending a request from the first computer to a manager of an engine installed on the second computers to activate one or more first plug-ins, sending an activation command from the engine to one or more plug-in managers running on the second computers, the plug-in managers associated with the first plug-in, activating the first plug-in; sending one or more values of one or more parameters of the second computers from the first plug-in to the plug-in managers, and sending one or more messages comprising the values of the parameters from the plug-in managers to the control and presentation component. The method can further comprise the steps of registering one or more control and presentation components with the engine, loading one or more plug-ins to the second computers, creating one or more plug-in managers for the plug-ins, adding the plug-in managers to a list of plug-in managers maintained by the engine, notifying the control and presentation components about the plug-in managers, and registering the control and presentation components with the plug-in managers. The activating step can comprise the steps of building a dependencies data structure comprising one or more plug-ins on which the first plug-in depends, adding one or more independent plug-ins or one or more plug-ins from the dependencies data structure whose dependent plug-ins have been activated, to a collection maintained by the engine, activating one or more second plug-ins from the collection, removing the second plug-in from the collection when the second plug-in is finished, if the collection is not empty—repeating the last two steps, and activating the first plug-in. The method can further comprise a presentation step for presenting data originated from the messages to the user.

Another aspect of the disclosed invention relates to an apparatus for receiving and presenting to a user of a first computer, an at least one parameter associated with an at least one second computer the apparatus comprising one or more control and presentation components, accessible from the first computer, one or more engines, residing on each of the second computers, the each engine comprising one or more manager components for communicating with one or more plug-in managers and with the control and presentation components. The apparatus can further comprise one or more plug-in components for retrieving the one or more parameters of the second computer, and one or more plug-in managers for activating the plug-in component. The apparatus can further comprise a plug-in loader for loading the plug-in to the second computer. The apparatus can further comprise a plug-in activator, for constructing a dependencies map for the plug-in and activating plug-ins from the dependencies map. The plug-in activator can comprise a pool manager. The user can be a support person.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Definitions

Figure 1:
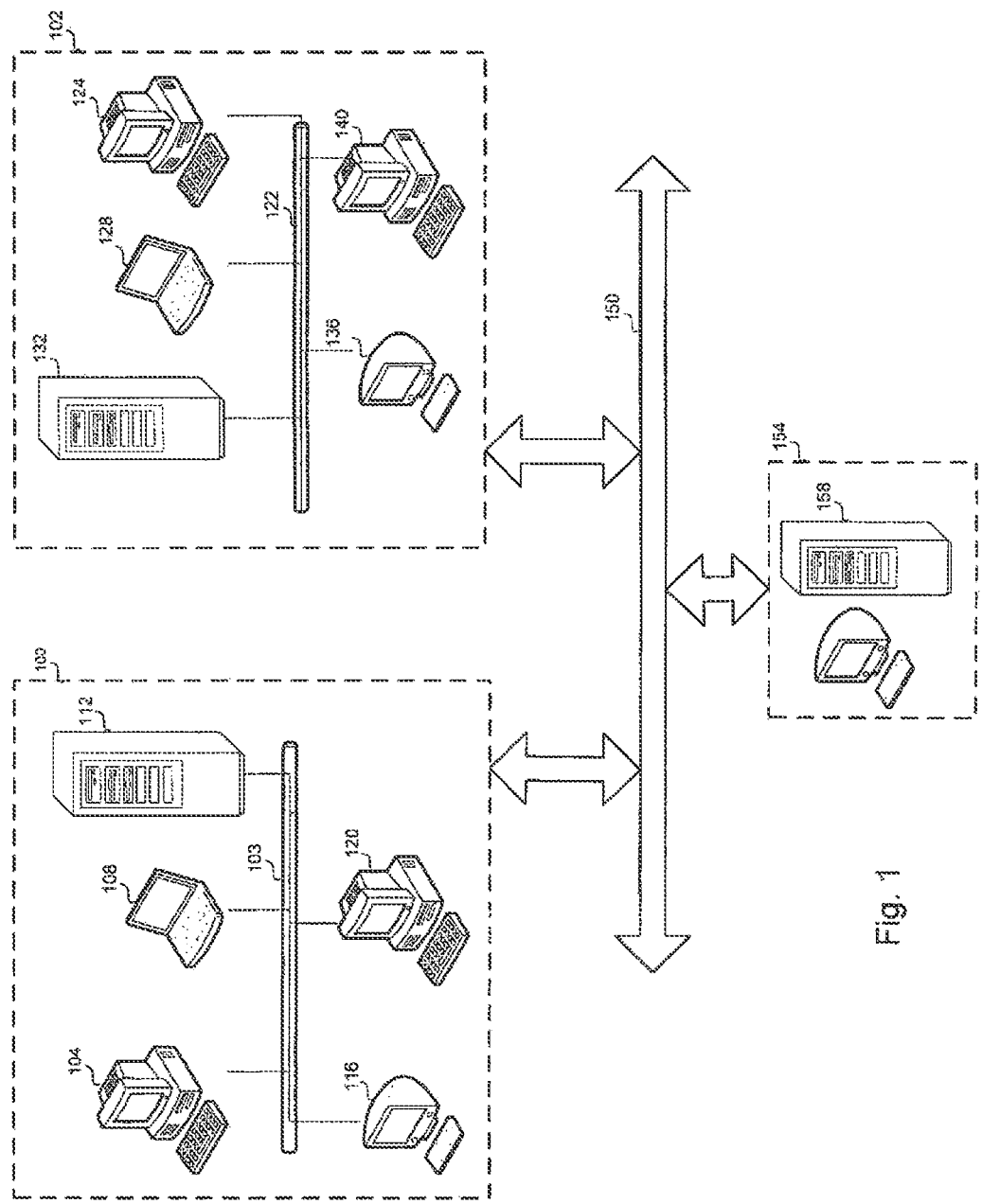
FIG. 1 is a schematic illustration of a typical environment in which the disclosed invention is used.

Plug-In: a plug-in is usually a computer program that can interact with another program and provide a certain, usually specific, function. A plug-in usually implements the other program's interfaces, and the other program is not required to support or have any specific knowledge of any specific plug-in but is required to support any plug-in that correctly implements its interfaces. In addition, one or more plug-ins can usually be added at any time, without requiring that the other program be removed or re-installed to support a new or updated plug-in.

The present invention overcomes the disadvantages of the prior art by providing a novel method and apparatus for remote support for applications installed or running on remote computers. The present invention discloses a two-part solution for a situation in which a support person is to provide service to multiple remote computers using one or more predetermined applications. One part of the solution comprises a generic engine residing on every computer that may run applications which require support and supplying relevant information related to that computer, while the other part comprises a control and presentation component that is run and used by support personnel or a system administrator, for receiving, presenting and analyzing the information from the engines running on the remote computers. Using the control and presentation component, the support person can optionally analyze or fix the problems at the remote computers. The engine running on each remote computer is associated with one or more application-specific components, wherein each component is preferably a plug-in. Each component is associated with one or more of the applications installed on the remote computer, which are supported by a support person possibly associated with a support center. The engine further comprises a component which communicates with the control and presentation component used by the support person on one hand, and with the application-specific components on the other hand, thus isolating the application-specific components from the control component. This architecture provides a separation between the presentation component, the engine which is responsible for activating the plug-ins, and the plug-ins themselves, thereby allowing for any of these components to be replaced by a newer version at anytime without affecting the other components. With such separation, the engine's activities do not depend on the presentation component nor on the plug-ins the engine is responsible for, and similarly for the presentation components and plug-ins. The components communicate through a predetermined protocol, which should be adhered to by any new version. In addition, a single presentation component could be used to manage more than one engine, giving the support person an ability to work on individual nodes in a cluster.

For one or more applications running on the remote computer and handled by the support personnel or system administrator, there are one or more application-specific components responsible for checking one or more specific parameters or items, such as files, resources, or configuration settings associated with one or more applications. Each application-specific components is accessed only by a dedicated manager. The engine communicates with the managers, which in turn communicate with the respective application-specific components. Thus, the engine does not know a-priori what application-specific components will be installed and used, which enables such application-specific components to be a plug-in program. In the context of the disclosed invention, multiple programs, preferably plug-ins, are associated with the engine, wherein each plug-in is accessed by a plug-in manager. Typically, a developer of an application also develops one or more plug-ins that check the necessary parameters such as resources and preconditions required for the application to run. The plug-ins are loaded to each server running the developed application. When a user is having a problem with the application, the support person or administrator activates one ore more plug-ins and thus gets a complete picture of the server and the installed application. Optionally, there are also general-purpose plug-ins, for example a plug-in that searches for a specific entry in the computer's registry, a plug-in that supplies the version of the operating-system, or the like.

Referring now to FIG. 1, showing an illustration of a typical environment in which the disclosed invention is used. Such environment comprises one or more computer networks, and is usually a part or all of a computer network of possibly geographically distributed organization. The network comprises computer clusters 100 and 102, each comprising multiple nodes, and a support center 154. Clusters 100, 102 and support center 154 can be located on the same or on different geographic locations. Alternatively, the support center is part of a different organization, providing technical support for multiple other organizations. Each of computer clusters 100, 102 is a group of computers that possibly share resources, such as files, printers, or the like. In the current example, cluster 100 comprises the following nodes: server 112 running one or more applications, wherein personal computers 104 and 120, laptop computer 108 and terminal 116, all belonging to the same cluster. All nodes of cluster 100 are connected through communication channel 103, being a Local Area Network, Wide Area Network, wireless communication or any other communication channel. Users of personal computers 104 and 120, laptop computer 108 and terminal 116 use the applications installed on server 112 through communication channel 103. Alternatively, the environment can comprise more then one server on cluster 100, wherein applications are installed on one or more servers. Similarly, cluster 102 comprises the following nodes: server 132, personal computers 124 and 140, laptop computer 128 and terminal 136, connected by communication channel 122. Clusters 100 and 102 communicate with each other and with additional clusters or computers via communication channel 150, which is a Local Area Network, Wide Area Network, wireless communication or any other communication channel. Area 154 is a support center, comprising one or more computers 158, operated locally, remotely or otherwise accessed by support personnel. The remote computer engine of the current invention is installed on one or more nodes within each cluster, for example, server 112 in cluster 100 and server 132 in cluster 102. Control and presentation component is preferably web-based and can therefore be installed on one or more support center computers 154, or hosted by one or more nodes in one or more clusters. Thus, when a user using any computer in cluster 100 or cluster 102 is having a difficulty, he or she calls support center 154. A support person working on computer 158 activates one or more of the plug-in programs installed on server 112 or on server 132, analyzes the received results and either fixes the problem or instructs the user how to fix it, or use the application in an appropriate manner. It will be appreciated by a person of ordinary skill in the art that the shown clusters are exemplary only, and any combination of computers and computer types can be utilized. Specifically, applications can be installed on another computer and not necessarily on the server, and accessed from other computers.

Figure 2:
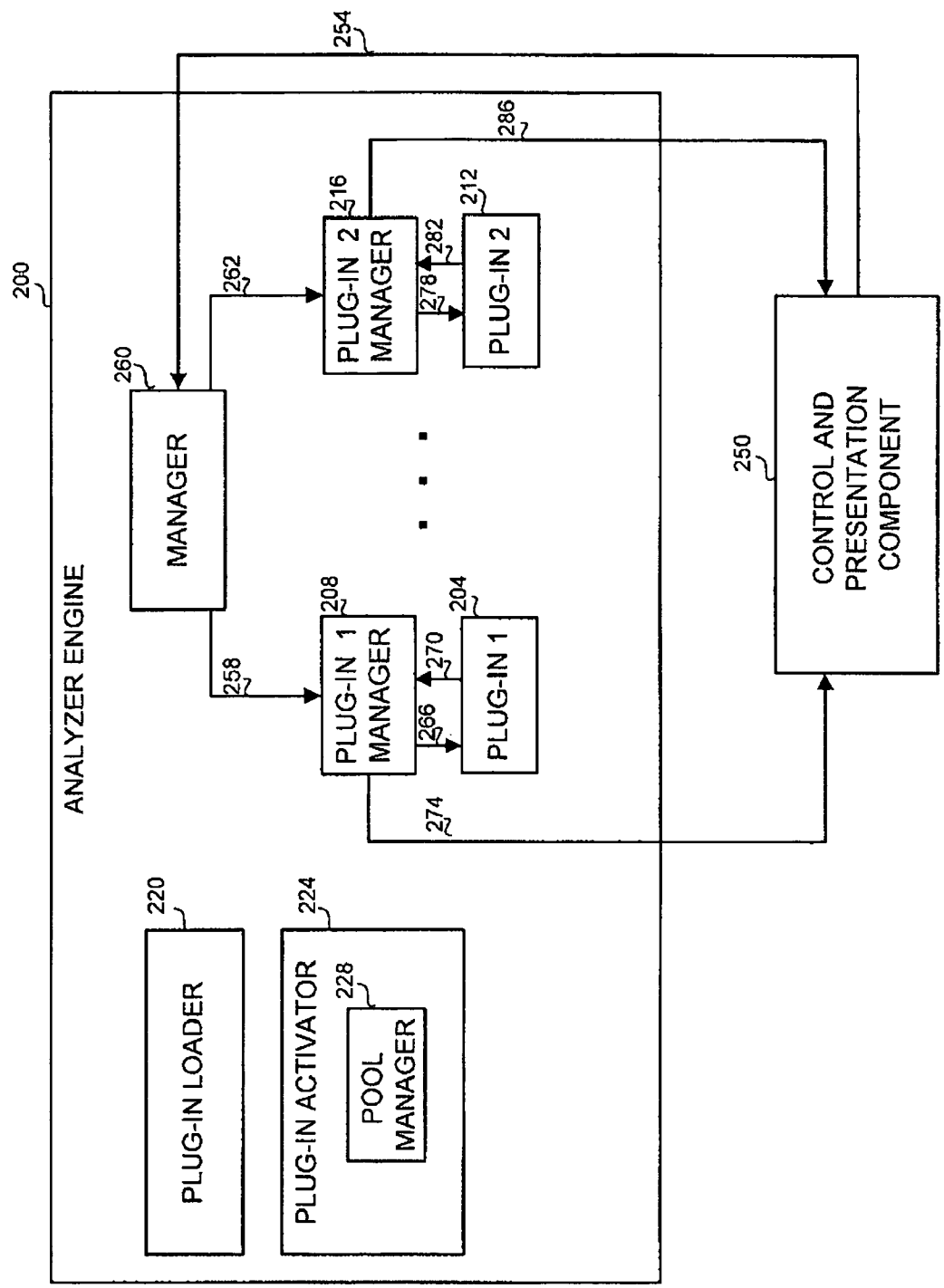
FIG. 2 is a schematic block diagram of the apparatus of the disclosed invention.

Referring now to FIG. 2, showing a schematic block diagram of the analyzer engine preferably running on a server node, which is typically remote, and the steps associated with the communications exchange between the engine's components and the presentation component. Engine 200 running on a server node, for example a remote computer such as 112 or of FIG. 1 or 132 of FIG. 2 is generally responsible for loading, managing, activating, and communicating with plug-ins installed on the node. Engine 200 comprises a loader component 220 and a plug-in activating component 224, detailed below. Engine 200 further comprises plug-in 1 (204) and plug in 2 (212) employed on the server. It will be appreciated that the number of the plug-ins is preferably not limited, and any number of plug-ins can be employed. For each plug-in installed on a server, a plug-in manager is created, for example manager (208) for plug-in 1 (204), and manager 216 for plug-in 2 (212), wherein the plug-in manager buffers the plug-in itself from other components. In an alternative embodiment, one plug-in manager can be created for two or more plug-ins. The control flow when activating the current system is as follows: a support person, or another person using or remotely accessing a control and presentation component 250 on a support computer, requests to activate a certain plug-in on a certain server node. A request to activate the plug-in is sent at step 254 from control and presentation component 250 to manager 260 of engine 200 on the specific node. Manager 260 directs the request to the relevant plug-in manager. In the current example, if the request was to activate plug-in 1 (204) then the request is directed at step 258 to plug-in manager 1 (208). Plug-in 1 manager (208) activates at step 266 plug-in 1 (204). Plug-in 1 (204) sends at step 270 one or more results or other messages back to plug-in 1 manager 208, which sends at step 274 updates to presentation component 250. Similarly, if the request was to activate plug-in 2 (212) then the request is directed at step 262 to plug-in manager 2 (216). Plug-in 2 manager (216) activates at step 278 plug-in 2 (212). Plug-in 2 (212) sends at step 282 one or more results or other messages back to plug-in 2 manager 216, which sends at step 286 updates to presentation component 250. An update is sent to presentation component 250 for each result or message received from plug-in 1 manager (208). Alternatively, an update is sent at predetermined time intervals comprising zero, one or more updates accumulated during the time interval, or according to any other criteria. If the plug-in that was requested to be activated is plug-in 2 (212), a respective chain of steps takes place. Using this implementation, the plug-in is designed to test one or more predetermined conditions, or run one or more checks. Once the plug-in determined a certain issue, it calls a method of the plug-in manager named, for example, "AddResult", or "AddMessage", to send the result or the message to the plug-in manager. The plug-in manager, in turn, receives the results or messages from the plug-in and sends them to control and presentation component 250, or simply sends a notification to control and presentation component 250 that there has been an update from the plug-in, leaving the presentation component the option to retrieve the updated results or messages, without having to handle presenting the results, updating the presentation or the like.

Figure 3:
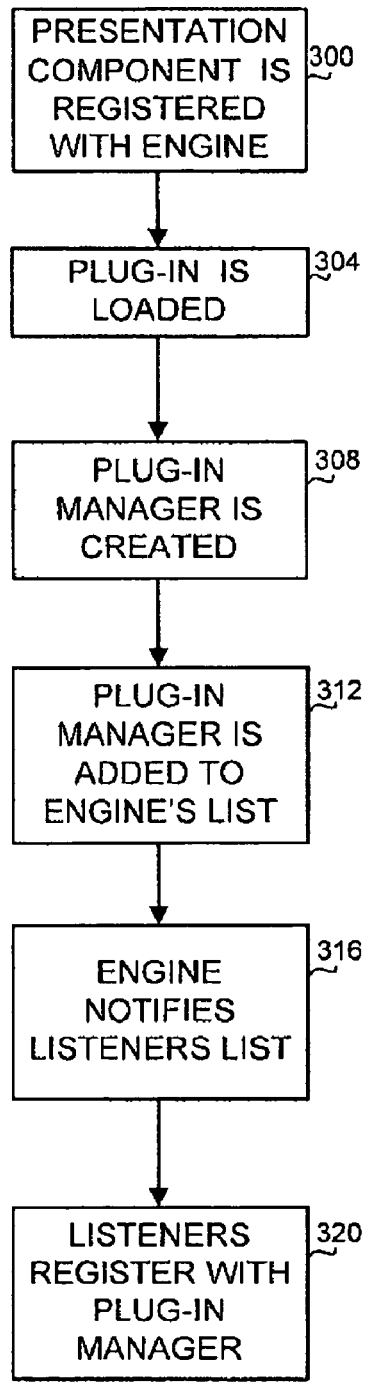
FIG. 3 is a flowchart detailing the steps occurring when a new plug-in is introduced to a server, in accordance with a preferred embodiment of the present invention.

Referring now to FIG. 3, which is a flowchart detailing the steps occurring when a new plug-in is introduced to a server, in order to enable the chain of calls detailed in association with FIG. 2 above. At step 300, a presentation component which can control the remote engine is registered with the engine, i.e. it sends a request to the remote engine to add the presentation component to a maintained list of presentation components or other components. The engine keeps a list of all presentation components that can view or control it, and at step 300 such component is registered with the engine and is added to a list. At step 304 a new or modified plug-in is loaded to the server for deployment. The loading step is further detailed below. As a part of the deployment of the plug-in, a dedicated manager is created at step 308 by the engine, and associated with the plug-in. All plug-in managers preferably implement the same interface, or are instances of the same class or of other classes extending the same abstract class, and some of their functionalities are therefore identical. At step 312 the plug-in manager created at step 308 is added to a collection of plug-in managers maintained by the engine. Each item in the collection comprises a pointer to, an address of, or another reference to a plug-in manager, and the name, ID or another identification of the plug-in associated with the specific manager. At step 316 the engine notifies all presentation components that were associated through registration therewith at step 300 (preferably each component registered separately), about the new plug-in manager, so that all the presentation components receive a notification of the new plug-in manager and the plug-in associated with the plug-in manager. Then at step 320, each such presentation component sends a request to be registered as a listener of the plug-in manager, so it can be notified by the plug-in manager about events of one or more types, such as addition of results, completion of a plug-in run or the like.

Referring now back to FIG. 2, presentation component 250, which has been notified at step 316 of FIG. 3 of every plug-in such as plug-in 1 (204) in the respective engine, can activate the plug-in by sending at step 254 a request to engine 200. Engine 200 searches for the plug-in manager relevant for plug-in 1 (204), finds plug-in 1 manager (208), and sends at step 258 the request to manager (208). Manager (208) sends at step 266 the request to plug-in 1 (204), which activates and performs the comprised instructions, and sends at step 270 one or more results back to plug-in 1 manager (208). Each such result, including a notification relating to execution completion or to an intermediate result can be sent by each plug-in such as plug-in 1 (204) at anytime while the plug-in is operating. The plug-in manager is notified of the new result and can dynamically notify all of its listeners. Therefore, the presentation component can be dynamically updated by new results without having to wait for the plug-in to complete execution. Plug-in 1 manager (208), after having received the results, sends them to all its listeners, including presentation component 250, which presents the results, or otherwise uses them. Plug-in loader 220 is responsible for loading a plug-in, following a command from control and presentation component 250. A command to load a plug-in comprises the name and path of an archive file, such as a JAR file. Loader 220 downloads the archive file and performs a search inside the archive file for a predetermined file of a predetermined format, such as XML, or any property file format for the names of all the plug-ins that are included inside the archive file and the location of any additional software components such as libraries that any of the plug-ins require. Additionally, further specification and configuration options of the plug-ins can be specified in this archive file. Preloading checks such as plug-ins that log into the server or perform any type of initialization task can take place immediately after the plug-ins have been loaded without the user manually executing them. After loading each plug-in, a plug-in manager is created as explained in association with step 308 of FIG. 3. Preferably, the loading mechanism uses a java class called URLClassloader or any class, such as a java class, capable of dynamically (i.e., while the application is already running) loading the contents of an archive file into the memory of the run-time environment and providing a means for the engine to access and use the contents of the archive file. For each plug-in loading, a separate instance of the URLClassloader (or the other class) is created, so that each plug-in is loaded into a preferably separate memory space in the run-time environment. A plug-in archive file can be loaded via FTP, HTTP, a local hard drive or any other method. Plug-in activator 224 of FIG. 2 is responsible for activating the required plug-in, as detailed in association with FIG. 4 below. Optionally, in order to run a predetermined plug-in, one or more other plug-ins have to run successfully as a pre-requisite. Possibly, one or more of the other plug-ins can also depend on additional plug-ins. There is no limitation on the number or order of plug-ins that should be completed successfully before a certain plug-in can be executed. For handling the plug-in dependencies, a plug-in activator 224, which utilizes a pool manager 228 is used.

Figure 4:
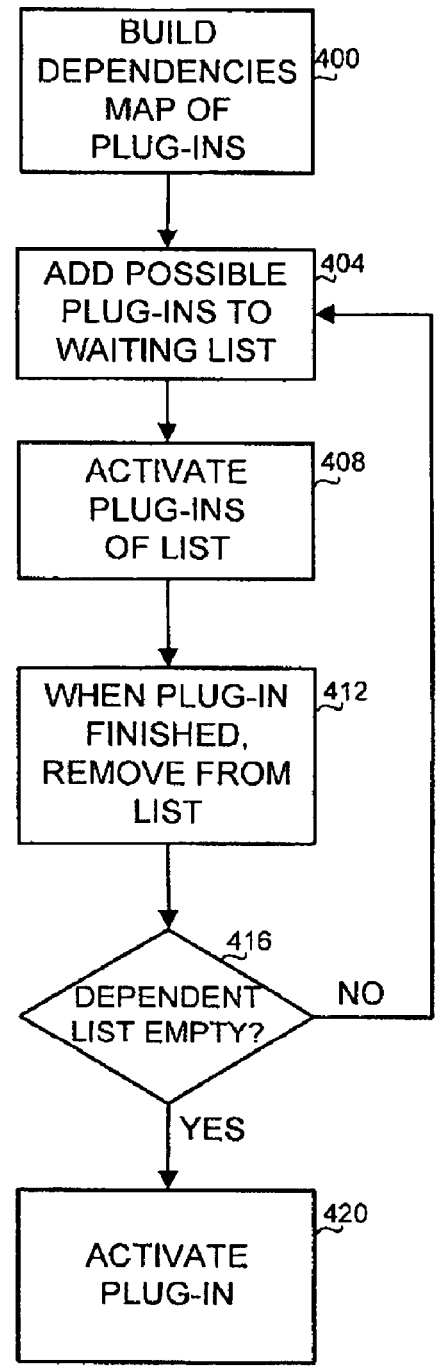
FIG. 4 is a flowchart of the steps performed for activating a plug-in, in accordance with a preferred embodiment of the present invention.

Referring now to FIG. 4, which shows a flowchart of the steps performed by plug-in activator 224 and pool manager 228 for activating a specific plug-in. In a preferred embodiment, pool manager 228 maintains a collection, for example a list named "waiting list", of independent plug-ins, and a collection of dependent plug-ins. At step 400, plug-in activator 224 of FIG. 2, upon receiving a plug-in to be activated, constructs a dependencies map, or another data structure for the plug-in, comprising the plug-ins that are required to run before the plug-in to be activated can run. At step 404, all the independent plug-ins from the data structure, or at a later stage the plug-ins whose pre-required plug-ins have been successfully activated, are added to the waiting list, while the other plug-ins from the data structure are added to the dependent list. Pool manager 228 issues a request to each plug-in that is added to the waiting list, and pool manager 228 is notified when the plug-in's execution is finished. At step 408, pool manager 228 activates one or more of the plug-ins in the waiting list. The number of activated plug-ins optionally depends on considerations such as the number of allowed threads, load balance, database connections, other considerations possibly related to limited resources, or the like. Once a plug-in is has completed execution, it notifies pool manager 228 and possibly additional entities. Upon receiving the completion notification, pool manager 228 removes the activated plug-in from the waiting list at step 412, and checks at step 416 if the dependent list is empty. If the dependent list is empty, the required plug-in can be activated. Otherwise, the pool manager repeats the previous steps and examines one or more of the plug-ins in the dependent list, and adds the independent plug-ins to the waiting list. The process continues until the dependent list is empty, at which stage the required plug-in is activated at step 420, and the plug-in manager associated therewith notifies control and presentation component 250 of FIG. 2. If any of the plug-ins did not activate successfully, the process stops and a message is issued to plug-in manager 224. It will be appreciated that there exist additional schemes than the presented one for activating a plug-in that depends in a hierarchical manner on additional plug-ins.

Figure 5:
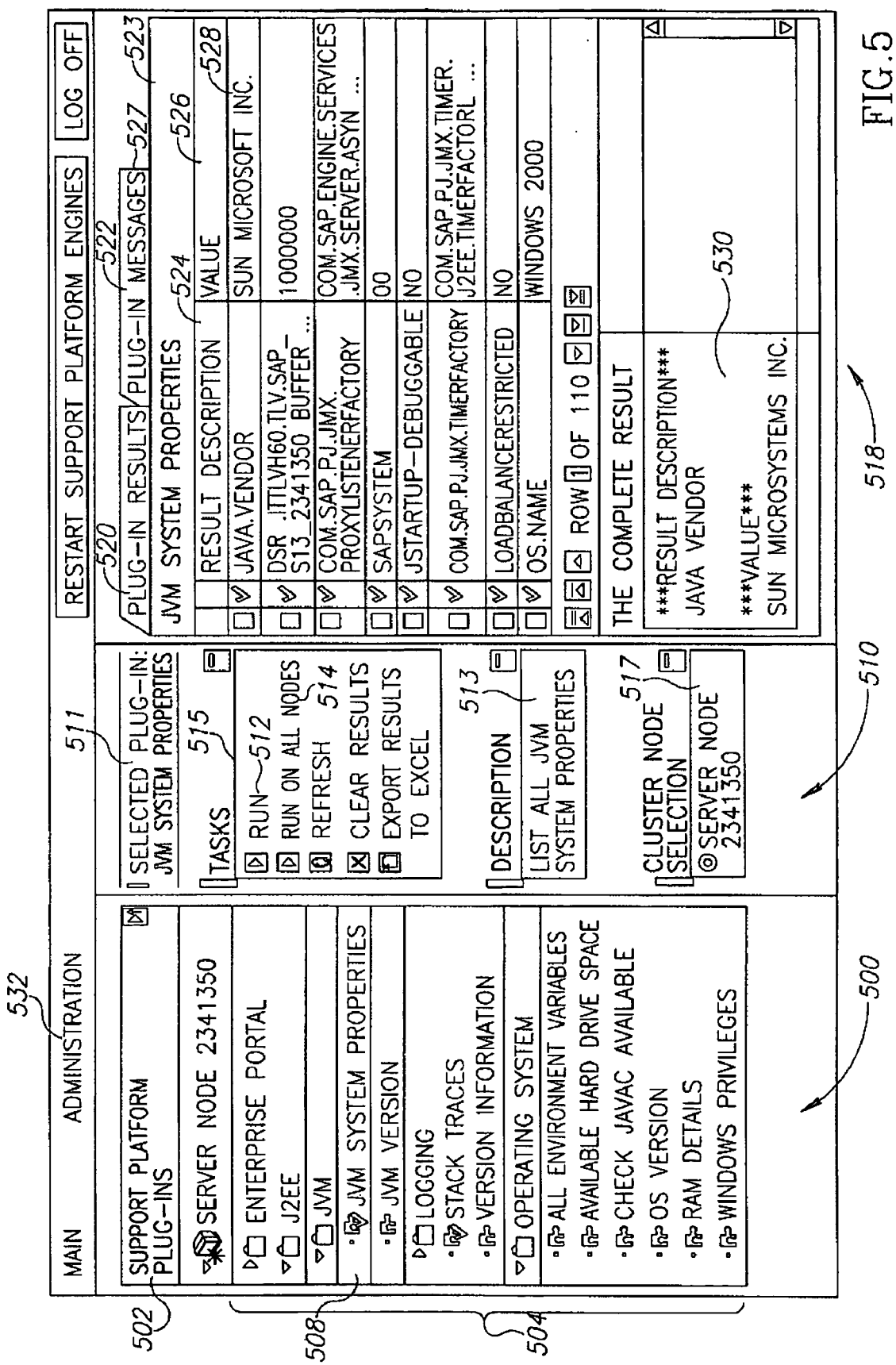
FIG. 5 is an illustration of the user interface of the control and presentation component, in accordance with a preferred embodiment of the present invention.

Referring now to FIG. 5, showing a possible user interface of control and presentation component 250 of FIG. 2. The user interface comprises plug-in pane 500, task pane area 510 and results pane 518. Plug-in pane 500 shows one or more of the available plug-ins 504 for each handled node 502. If there is more than one handled node, the plug-ins are preferably synchronized across the nodes of the cluster. Plug-ins 504 are preferably organized in groups having a hierarchical structure, wherein each group can comprise plug-ins and/or further groups. The group hierarchy is preferably constructed based, for example, on a string representation of the plug-ins and plug-in groups, wherein a string separator such as a slash separates between the name of a plug-in and the group hierarchy that it belongs to. Therefore, a single string can represent a hierarchy of group names separated by slashes and the name of the plug-in itself is the word following the last slash in the string. Active plug-in 508, selected by the user is possibly highlighted or otherwise marked to allow quick identification by a user. Task pane 510 preferably comprises an indication 511 for the active plug-in, a description 513 of the plug-in as entered by the plug-in's developer and retrieved dynamically by the presentation component, and an indication 517 of the active node. Task pane 510 further comprises a list 515 of the possible tasks, including a "run" button 512, which when selected initiates the execution of the selected plug-in on the active node and "run on all nodes" button 514 which when selected initiates the execution of the selected plug-ins on all the nodes handled by the component. Pressing on "run" button 512 issues request 254 of FIG. 2 to activate the plug-in on the active server, and starts the workflow detailed in association with FIG. 2 above. Pressing on run on all nodes button 514 starts the workflow on each of the servers associated with the component. The execution can be performed in parallel, sequentially, or any combination of the above according to predetermined user selection. Results pane 518 preferably comprises a title area 523, showing the plug-in name, and two columns, a result description column 524 showing the name of a property returned by the plug-in, and a value column 526, for the value returned by the plug-in for that property. Pane 518 further comprises a complete result area 530, showing full details of the response returned for active property 528. Results pane 518 further comprises a plug-in messages window (not shown), accessed by pushing plug-in messages option 522 of button 527 (which also include a plug-in results option 520), showing messages issued by the plug-in rather than results. Adding or deleting a plug-in or a server node, or changing the plug-ins hierarchy is preferably done when the user interface component is in administration mode, entered by pressing administration button 532. The user interface component preferably further comprises a comparison mode, in which the results of the execution of a plug-in on two or more servers are shown in a table, wherein each column shows the results on a specific node. This mode enables a user to tell the differences between the behaviors of the plug-in on different platforms, and thus help the user analyze a problem that appears only on a subset of nodes with one or more plug-ins.

A preferred embodiment of the disclosed invention provides a user with a programming wizard to enable fast production of plug-ins. A programming wizard is a program that generates a skeleton of source code for another program or family of programs, wherein the user can contentrate on the logic required for the written plug-in, rather than handle details relating to tasks such as communication, persistance or the like. Such plug-in wizard supplies the user with a skeleton program, including a body of a method named, for example, "Analyze", wherein the user writes the core of the plug-in, i.e. what the specific plug-in is checking. The "analyzed" method is the method that is executed when the plug-in itself is activated. Another method which the user can supply code for is "Fix", which when called, fixes a condition, for example by creating a directory, a file or another resource. The "Fix" method is a means for the developer of the plug-in to give the user of the plug-in a way to optionally fix a problem discovered by the plug-in during the execution of the "Analyze" method. Within the "Analyze" or "Fix" methods the user should call methods supplied by the wizard, including "AddMessage" which sends a message to the plug-in manager associated with the plug-in, or "AddResult" which preferably sends a description of a property and the value of the property to the plug-in manager. The address or another reference to the plug-in manager is supplied to the plug-in in run-time, since the plug-in manager invokes the plug-in.

The disclosed invention provides an efficient way for a support person to analyze problems on a multiplicity of remote computers, by activating dedicated programs called plug-ins that test certain situations on the remote computer. The programs are activated from a control and presentation component. The remote computer comprises an engine that dispatches the calls to components associated with the plug-ins called plug-in managers. The plug-in managers activate the plug-ins, receive their responses and transfers the responses to the control and presentation component. Thus the plug-ins do not implement communication details, and the plug-in managers do not implement presentation issues. The plug-ins are preferably developed using a dedicated programming wizard that allows the developer to concentrate on the essence of the plug-in rather than on peripheral details.

It will be appreciated by a person of ordinary skill in the art that the disclosed apparatus and methods are exemplary only, and that a different division of the tasks between the engines running on the remote locations and the control and presentation unit may be implemented. The division of tasks within each remote engine, between the general components, the plug-in and the plug-in managers can also be changed.

It will be appreciated by persons skilled in the art that the present invention is not limited to what has been particularly shown and described hereinabove. Rather the scope of the present invention is defined only by the claims which follow.

We claim:

1. A method for receiving and presenting to a support person using a control and presentation component installed on a first computer associated with a support platform, at least one system property parameter of at least one second computer, the at least one system property parameter having at least one system property value, the method comprising:
   receiving from the support person, via a graphical support plug-in hierarchy user interface, an indication that at least one support plug-in should be activated on a plurality of other computers including the at least one second computer, a first one of the plurality of other computers being in a first cluster and a second one of the plurality of other computers being in a second cluster;
   based on said indication, automatically sending a request from the first computer to a manager of an engine installed on the second computer to activate the at least one support plug in;
   sending an activation command from the engine to at least one support plug-in manager running on the second computer, said at least one support plug-in manager associated with said at least one support plug-in;
   activating the at least one support plug-in;
   sending the at least one system property value of the at least one system property parameter of the at least one second computer from the at least one support plug-in to the at least one support plug-in manager;
   sending at least one support message comprising the at least one system property value of the at least one system property parameter from the at least one support plug-in manager to the control and presentation component,
   wherein the at least one system property value of the at least one system property parameter sent from the at least one support plug-in to the at least one support plug-in manager and sent from the at least one support plug-in manager to the control and presentation component comprises the at least one system property value of the at least one system property parameter usable in checking for the existence or absence of a resource in the second computer, the existence or absence of the resource in the second computer being required for running an application on the second computer;
   wherein the at least one support plug-in is automatically activated on the first one of the plurality of other computers and on the second one of the plurality of other computers based on the single indication received from the support person;
   wherein the graphical support plug-in hierarchy user interface comprises a comparison mode, in which results of execution of the at least one support plug-in on two or more servers are shown in a table, a first one of the two or more servers being in the first cluster and a second one of the two or more servers being in the second cluster, wherein each column in the table shows the results on a specific node of the first cluster, a first column of the table showing the results on a first node of the first cluster, a second column of the table showing the results on a second node of the first cluster;
   wherein the results on the first node that are shown in the first column of the table indicate a result of a check of files, resources, or configuration settings associated with one or more applications; and
   wherein the results on the second node that are shown in the second column of the table indicate a result of a check of files, resources, or configuration settings associated with the one or more applications.

2. The method of claim 1 further comprising the steps of:
   registering the at least one control and presentation component with the engine;
   loading the at least one support plug-in to the second computer;
   creating the at least one support plug-in manager for the at least one support plug-in;
   adding the at least one support plug-in manager to a list of support plug-in managers maintained by the engine;
   notifying the at least one control and presentation component about the at least one support plug-in manager; and
   registering the at least one control and presentation component with the at least one support plug-in manager.

3. The method of claim 1 wherein the activating step comprises the steps of:
   building a dependencies data structure comprising one or more support plug-ins on which the at least one support plug-in depends;
   adding one or more independent support plug-ins or one or more support plug-ins from the dependencies data structure whose dependent support plug-ins have been activated, to a collection maintained by the engine;
   (a) activating at least one second support plug-in from the collection;
   (b) removing the second support plug-in from the collection when the second support plug-in is finished; and
   (c) if the collection is not empty, repeating steps a and b,
   (d) activating the at least one support plug-in.

4. The method of claim 1 further comprising a presentation step for presenting data originated from the at least one support message to the support person via the graphical user interface.

5. The method of claim 1 wherein the at least one system property value of the at least one system property parameter usable in checking for the existence or absence of a resource in the second computer is usable in checking for the existence of a specific entry in a registry of the second computer.

6. The method of claim 1 wherein the at least one system property value of the at least one system property parameter usable in checking for the existence or absence of a resource in the second computer indicates a version of an operating system in the second computer.

7. The method of claim 1 wherein the existence or absence of the resource in the second computer is required for running an application other than the at least one support plug-in.

8. The method of claim 7 wherein the at least one system property value of the at least one system property parameter usable in checking for the existence or absence of a resource in the second computer is usable in checking for the existence of a specific entry in a registry of the second computer.

9. The method of claim 7 wherein the at least one system property value of the at least one system property parameter usable in checking for the existence or absence of a resource in the second computer indicates a version of an operating system in the second computer.

10. The method of claim 1 wherein the results on the first node that are shown in the first column of the table indicate a result of a check of files associated with the one or more applications; and wherein the results on the second node that are shown in the second column of the table indicate a result of a check of the files associated with the one or more applications.

11. The method of claim 1 wherein the results on the first node that are shown in the first column of the table indicate a result of a check of resources associated with the one or more applications; and
   wherein the results on the second node that are shown in the second column of the table indicate a result of a check of the resources associated with the one or more applications.

12. The method of claim 1 wherein the results on the first node that are shown in the first column of the table indicate a result of a check of configuration settings associated with the one or more applications; and
   wherein the results on the second node that are shown in the second column of the table indicate a result of a check of the configuration settings associated with the one or more applications.

13. An apparatus for receiving and presenting to a support person of a first computer, at least one parameter of at least one second computer the apparatus comprising:
   a computer in which is installed at least one control and presentation component, accessible from the at least one first computer, for facilitating the activation of at least one support plug-in on a plurality of remote computers including the at least one second computer in response to a single indication received from the support person via a graphical support plug-in hierarchy user interface, a first one of the plurality of remote computers being in a first cluster and a second one of the plurality of remote computers being in a second cluster;
   at least one engine, residing on the at least one second computer, the at least one engine comprising at least one support manager component for communicating with at least one support plug-in manager and with the at least one control and presentation component, wherein the at least one support plug-in is for retrieving the at least one parameter of the at least one second computer and the at least one support plug-in manager is for activating the at least one support plug-in;
   wherein the at least one support plug-in is automatically activated on the first one of the plurality of remote computers and the second one of the plurality of remote computers based on the single indication received from the support person;
   wherein the communicating with the at least one support plug-in manager and with the at least one control and presentation component comprises:
      receiving the at least one parameter from the at least one support plug-in manager; and
      sending the at least one parameter to the at least one control and presentation component;
      wherein the at least one parameter received from the at least one support plug-in manager and sent to the at least one control and presentation component comprises:
         the at least one parameter usable in checking for the existence or absence of a resource in the at least one second computer, the existence or absence of the resource in the at least one second computer being required for running an application on the at least one second computer;
   wherein the graphical support plug-in hierarchy user interface comprises a comparison mode, in which results of execution of the at least on support plug-in on two or more servers are shown in a table, a first one of the two or more servers being in the first cluster and a second one of the two or more servers being in the second cluster, wherein each column in the table shows the results on a specific node of the first cluster, a first column of the table showing the results on a first node of the first cluster, a second column of the table showing the results on a second node of the first cluster;
   wherein the results on the first node that are shown in the first column of the table indicate a result of a check of file, resources, or configuration settings, associated with one or more applications; and
   wherein the results on the second node that are shown in the second column of the table indicate a result of a check of file, resources, or configuration settings associated with the one or more applications.

14. The apparatus of claim 13 further comprising a support plug-in loader for loading the at least one support plug-in to the at least one second computer.

15. The apparatus of claim 13 further comprising a support plug-in activator, for constructing a dependencies map for the at least one support plug-in and activating support plug-ins from the dependencies map.

16. The apparatus of claim 15 wherein the support plug-in activator comprises a pool manager.

17. The apparatus of claim 13 wherein the at least one parameter usable in checking for the existence or absence of a resource in the at least one second computer is usable in checking for the existence of a specific entry in a registry of the at least one second computer.

18. The apparatus of claim 13 wherein the at least one parameter usable in checking for the existence or absence of a resource in the at least one second computer indicates a version of an operating system in the at least one second computer.

19. The apparatus of claim 13 wherein the existence or absence of the resource in the at least one second computer is required for running an application other than the at least one support plug-in.

20. The apparatus of claim 19 wherein the at least one parameter usable in checking for the existence or absence of a resource in the at least one second computer is usable in checking for the existence of a specific entry in a registry of the at least one second computer.

21. The apparatus of claim 19 wherein the at least one parameter usable in checking for the existence or absence of a resource in the at least one second computer indicates a version of an operating system in the at least one second computer.

22. The apparatus of claim 13 wherein the results on the first node that are shown in the first column of the table indicate a result of a check of files associated with the one or more applications; and wherein the results on the second node that are shown in the second column of the table indicate a result of a check of the files associated with the one or more applications.

23. The apparatus of claim 13 wherein the results on the first node that are shown in the first column of the table indicate a result of a check of resources associated with the one or more applications; and wherein the results on the second node that are shown in the second column of the table indicate a result of a check of the resources associated with the one or more applications.

24. The apparatus of claim 13 wherein the results on the first node that are shown in the first column of the table indicate a result of a check of configuration settings associated with the one or more applications; and wherein the results on the second node that are shown in the second column of the table indicate a result of a check of the configuration settings associated with the one or more applications.

* * * * *